United States Patent [19]

Nietering

[11] Patent Number: 5,229,205
[45] Date of Patent: Jul. 20, 1993

[54] LAMINATED GLAZING UNIT HAVING IMPROVED INTERFACIAL ADHESION

[75] Inventor: Kenneth E. Nietering, Dearborn, Mich.

[73] Assignee: Ford Motor Company, Dearborn, Mich.

[21] Appl. No.: 751,377

[22] Filed: Aug. 28, 1991

Related U.S. Application Data

[62] Division of Ser. No. 631,112, Dec. 20, 1990, Pat. No. 5,069,968.

[51] Int. Cl.⁵ .............................................. B32B 17/06
[52] U.S. Cl. .................................... 428/336; 428/426; 428/432; 428/433; 428/480; 428/457; 428/469; 428/688; 428/699; 428/701; 428/702; 428/630; 428/632; 359/578; 359/580; 359/582
[58] Field of Search ............... 428/437, 426, 432, 433, 428/480, 457, 469, 336, 688, 699, 701, 702, 212, 215, 216, 630, 632; 350/1.6, 1.7, 164, 166; 359/578, 580, 582; 219/202, 203

[56] References Cited

U.S. PATENT DOCUMENTS

| | | | |
|---|---|---|---|
| 3,076,727 | 2/1963 | Harwig | 428/432 |
| 3,649,359 | 10/1969 | Apfel et al. | 359/587 |
| 3,682,528 | 8/1972 | Apfel et al. | 350/1 |
| 3,758,185 | 9/1973 | Gelber | 350/1 |
| 3,885,855 | 5/1975 | Gross | 350/1 |
| 3,990,784 | 11/1976 | Gelber | 428/432 |
| 4,045,125 | 8/1977 | Farges | 359/585 |
| 4,320,169 | 3/1982 | Yatabe et al. | 428/333 |
| 4,413,877 | 11/1983 | Suzuki et al. | 350/1.7 |
| 4,450,201 | 5/1984 | Brill et al. | 428/336 |
| 4,462,883 | 7/1984 | Hart | 204/192.26 |
| 4,465,736 | 8/1984 | Nishihara et al. | 428/332 |
| 4,548,691 | 10/1985 | Dietrich et al. | 204/192.27 |
| 4,707,820 | 11/1987 | Sawamura | 369/284 |
| 4,782,216 | 11/1988 | Woodard | 219/547 |
| 4,786,563 | 11/1988 | Gillery et al. | 428/432 X |
| 4,799,745 | 1/1989 | Meyer et al. | 359/360 |
| 4,834,857 | 5/1989 | Gillery | 428/432 |
| 4,844,985 | 7/1989 | Pharms et al. | 428/432 |
| 4,940,636 | 7/1990 | Brock et al. | 428/426 |
| 5,061,568 | 10/1991 | Kessel | 428/699 |

*Primary Examiner*—Ellis P. Robinson
*Assistant Examiner*—Timothy M. Speer
*Attorney, Agent, or Firm*—Roger L. May; Lorraine S. Melotik

[57] ABSTRACT

A glazing unit comprises a substrate ply and a laminating ply laminated to a surface of the substrate ply. A coating on the laminated surface of the substrate ply is a film stack comprising an electrically conductive film of silver metal covered by a tantalum pentoxide dielectric film immediately adjacent the laminating ply. Between the silver film and the tantalum pentoxide film is an adhesion film of metal selected from zinc and copper. Applications include, for example, glazing units for solar load reduction and electrically heated glazing units.

2 Claims, 2 Drawing Sheets

LAMINATED GLAZING UNIT HAVING IMPROVED INTERFACIAL ADHESION

This application is a division of application Ser. No. 07/631,112, filed on Dec. 20, 1990, issued as U.S. Pat. No. 5,069,968 on Dec. 31, 1991.

INTRODUCTION

The present invention provides a laminated glazing unit in which a surface of a first ply coated with a substantially transparent, electrically conductive film stack is laminated to a second ply comprising a flexible polymeric material. More specifically, the invention is directed to improving the durability of the interfacial adhesion within the film stack at the laminated interface between the two plys.

BACKGROUND OF THE INVENTION

Certain glazing units, such as motor vehicle windshields and the like, are provided with a substantially transparent, electrically conductive coating at a laminated interface between adjacent plys. Such coatings are known for use, for example, to reduce the amount of solar energy transmitted through the glazing unit, especially IR wavelength radiation. Architectural and motor vehicle windows are provided with such coatings to reduce the amount of heat energy passing through the window to reduce the air conditioning load. Such coatings, commonly referred to as solar load reduction or SLR coatings, typically comprise a film stack wherein one or more electrically conductive films of metal alternate with films of dielectric material, such as metal oxide. The individual films within the film stack may be deposited onto a substrate, preferably a substantially rigid and inextensible ply of the glazing unit, such as an exterior glass ply, by pyrolytic deposition, sputter coating, or other technique known to those skilled in the art.

The same film stack technology also is used for electrically heating glazing units. That is, substantially transparent film stacks comprising electrically conductive metal films alternating with dielectric films can be connected to a power source, such as a motor vehicle battery, generator or alternator system, by suitable circuitry. The sheet resistance of the film stack is selected to provide a desirable rate of heat generation in response to electric current flow through the film stack. Certain motor vehicle windshields presently manufactured with such electrical heating means employ a sputtered coating comprising a substantially transparent, electrically conductive film of silver metal sandwiched between films of zinc oxide. A sputtered coating of that type also provides a certain level of SLR functionality.

Lamination of the surface of the glass ply (or other glazing unit ply) carrying the aforesaid film stack to a laminating material such as polyvinyl butyral (PVB) or other flexible, polymeric laminating material is found to provide good interfacial adhesion. It has been found, however, that interfacial adhesion may be reduced by prolonged exposure to UV radiation, such as the UV component of sunlight. This is found to be true particularly in the case of PVB and other flexible polymeric laminating materials having an alcoholic hydroxyl group (R—OH). For purposes of improving the durability of glazing units having a laminated interface between a surface of a ply coated with a substantially transparent, electrically conductive film stack and a ply of flexible, polymeric laminating material, there is a need to improve the durability of the adhesion between such film stack and the laminating material against prolonged exposure to UV radiation. Improved interfacial adhesion is taught in U.S. Pat. No. 4,844,985 to Pharms et al, assigned to Ford Motor Company, wherein a barrier or adhesion layer of chromium oxide complex is taught. Specifically, a thin layer of chromium oxide complex is deposited over a zinc oxide dielectric layer in a film stack comprising alternating layers of silver and zinc oxide. This enhances the durability of the interfacial adhesion to PVB and like laminating materials. A substantial need exists to provide alternative or additional means to improve interfacial adhesion durability.

It is an object of the present invention to improve the durability of laminated glazing units by improving the durability of such interfacial adhesion against prolonged exposure to UV radiation. Additional objects and advantages of the invention will be understood from the following disclosure thereof and detailed description of various preferred embodiments.

SUMMARY OF THE INVENTION

According to the present invention a laminated glazing unit is provided comprising at least a substrate ply and a laminating ply laminated to a surface of the substrate ply. A substantially transparent, electrically conductive coating is provided on the laminated surface of the substrate ply, that is, at the interface between the substrate ply and the laminating ply. The coating comprises a film stack having (i) a film of dielectric material adjacent to the laminating ply consisting essentially of tantalum pentoxide, (ii) an adhesion film over the tantalum pentoxide film, and (iii) an electrically conductive film over the adhesion film. The adhesion of tantalum pentoxide to PVB or other laminating material, particularly those having in their molecular structure an alcoholic hydroxyl group, is substantially better than that of various known alternative dielectric materials. That is, it is substantially better able to withstand exposure to UV radiation and retain good adhesion at the interface. The interfacial adhesion of tantalum pentoxide with films of silver metal is insufficient, however, for many applications. This significant adhesion deficiency would discourage consideration of tantalum pentoxide in film stacks of the type discussed.

The adhesion deficiency is overcome by an additional feature of the present invention, specifically, an additional film employed as an adhesion film between the tantalum pentoxide and the silver metal film. An adhesion film of metal selected from the group consisting of zinc and copper, copper being preferred, overcomes the adhesion deficiency between the tantalum pentoxide and the silver. Such adhesion film is found to provide good adhesion both to the tantalum pentoxide on one side and the silver on the other. Moreover, the adhesion is found to be durable, remaining good even after prolonged exposure to substantial UV radiation. Taken together with the good and durable adhesion at the tantalum pentoxide interface with the polymeric laminating material, the present invention can be understood to provide a significant advance in the art.

As described in detail below, the adhesion film preferably is relatively thin in comparison to the silver metal film. It has been found that even an ultra-thin adhesion film substantially improves the durability of the interfacial adhesion against exposure to UV radiation. The adhesion film can not replace entirely the silver film used in the film stack, since copper and zinc each has optical and electrical properties which differ from those of silver. Specifically, for example, in a film stack comprising alternating layers of silver metal and zinc oxide, replacing the silver entirely with copper would result in a glazing unit having more visible color and lower transmission of visible light.

The zinc and copper employed in the adhesion films of the invention sputter well and can be easily deposited in adequate thickness. Used as a thin layer for purposes of improving adhesion, the time and cost penalty is quite acceptable in view of the greatly improved interfacial adhesion durability it provides. The present invention is a significant technological advance for all these reasons.

Additional features and advantages of the invention will be better understood from the appended drawings and the following detailed description of certain preferred embodiments of the invention.

BRIEF DESCRIPTION OF THE DRAWINGS

In the following description of certain preferred embodiments of the invention, reference will be made to the accompanying drawings wherein.

DETAILED DESCRIPTION OF PREFERRED EMBODIMENTS

Figure 1:
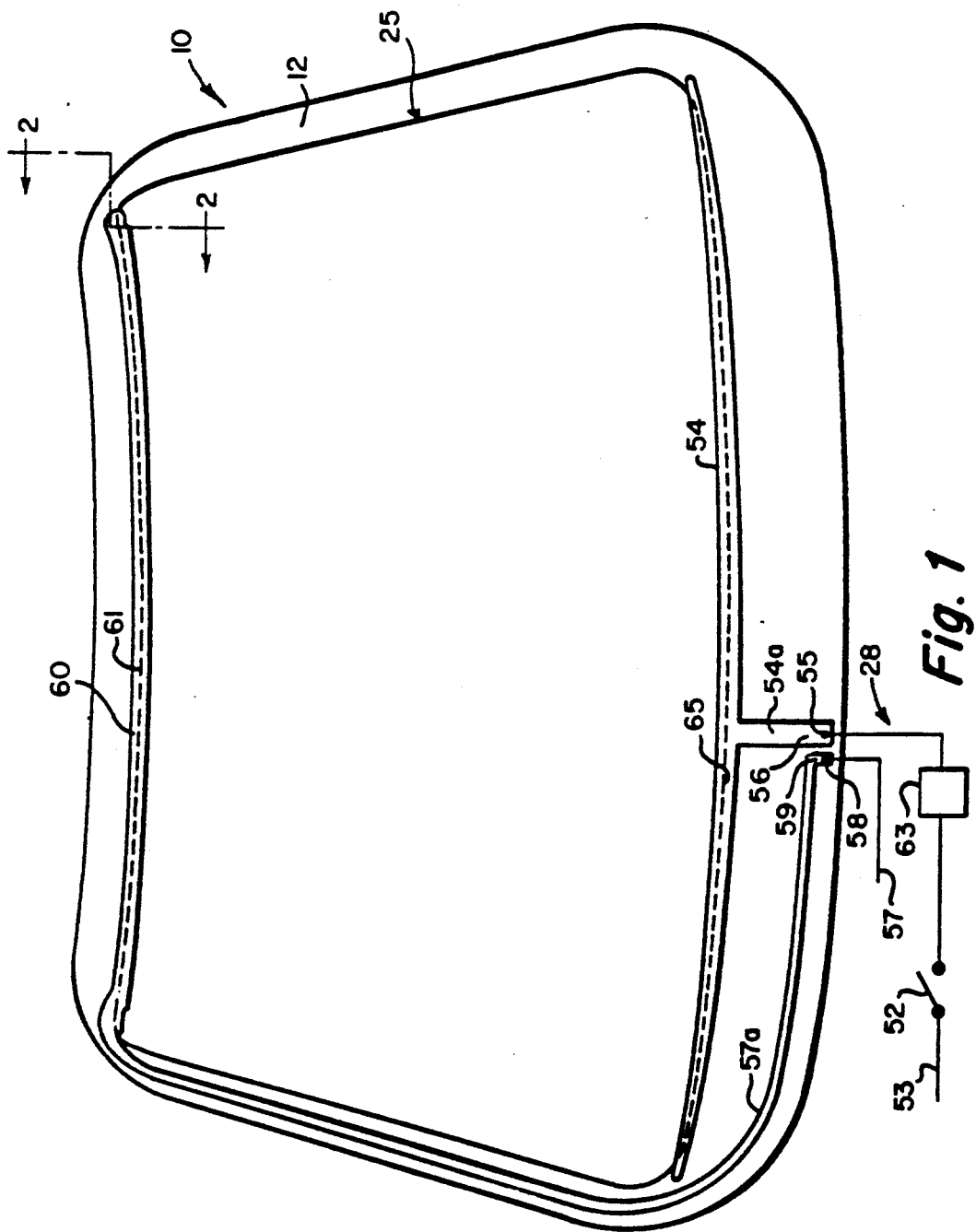
FIG. 1 is a schematic plan view of an electrically heated motor vehicle windshield according to a preferred embodiment of the invention.
Figure 3:
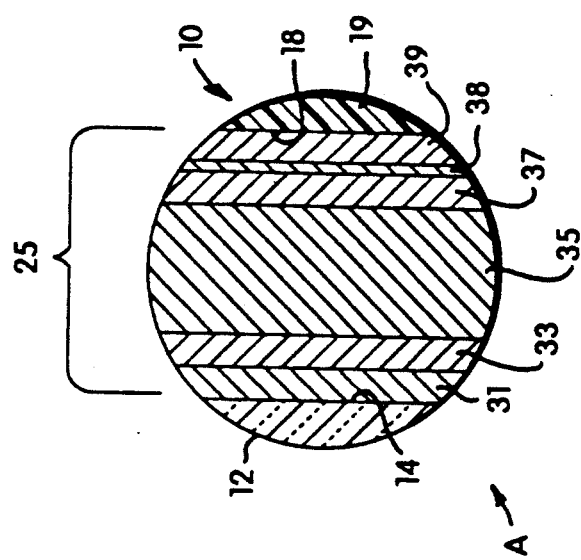
FIG. 3 is an exploded view of area A of FIG. 2.
Figure 2:
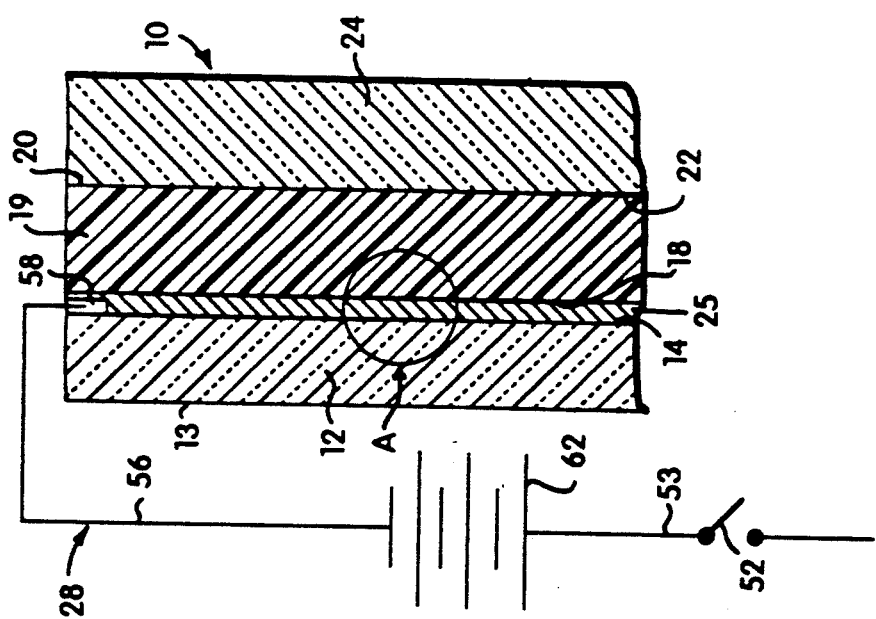
FIG. 2 is a schematic, cross-section view through line 2—2 in FIG. 1.

The glazing unit 10 illustrated in FIGS. 1-3 is a preferred embodiment of the invention adapted for use as a motor vehicle windshield. As described below, it comprises an SLR film, specifically, a Fabry-Perot interference filter for solar load reduction. In addition, means are provided for passing an electrical current through the SLR film for electrically heating the windshield. The Fabry-Perot interference filter has selectively low transmissivity of infrared radiation, while having relatively higher transmissivity of visible wavelength light. Windshield 10 is seen to comprise an outer glass ply 12 having an exterior surface 13 and an interior laminated surface 14. Various suitable alternative substrate ply materials are commercially available. Preferably an inextensible material is employed to facilitate deposition and to protect the integrity of the film stack. Suitable inextensible plastic materials include, for example, polyethylene terephthalate. The interior surface of the outer glass ply 12 is laminated to a first surface 18 of a laminating ply 19 of PVB. The opposite surface 20 of the PVB ply is laminated to surface 22 of a second glass ply 24, such that the PVB is sandwiched between glass plys 12 and 24.

Laminated surface 14 of glass ply 12 carries a sputtered coating 25. Thus, coating 25 is at the laminated interface between glass ply 12 and PVB ply 19. Coating 25 is a substantially transparent, electrically conductive Fabry-Perot interference filter able to selectively reject a substantial portion of the infrared radiation of normal sunlight while allowing transmittance through the glazing unit of at least about 70% of the visible wavelength portion of normal sunlight. Thus, coating 25 functions as a solar load reduction coating. In addition, means 28 is provided for passing an electrical current through coating 25 for electrically heating the coating and, therefore, the glazing unit to defog or deice the glazing unit. Electrical circuit means 28 comprises, in addition to the electrically conductive SLR film stack 25, an on/off switch 52 interrupting electrical lead 53 which extends to a bus bar 54 at the lower edge 65 of the SLR film stack via connection means, specifically, solder pad connection 55 at the terminus 56 of lead 54a within the laminated unit. Similarly, electrical lead 57 extends from solder pad connector 58 at terminus 59 of lead 57a to bus bar 60 at the top edge 61 of the SLR film stack. The electrical power source, in the case of a motor vehicle, is preferably the motor vehicle alternator system. The bus bars 54 and 60 and electrical leads 54a and 57a can be formed by silk screening a conductive ceramic paint onto the surface of the glass ply 12, or by other methods known to the skilled of the art. To provide good distribution of electrical power, and hence heating, in the SLR element, the bus bars, as shown, preferably comprise a pair of spaced, substantially parallel, elongate bus bars in electrical contact with opposite edges of the SLR film stack. Since the lower bus bar is longer than the upper bus bar, a recess preferably is provided at the left side (as viewed in FIG. 1) of the lower edge of the upper bus bar 60. A similar recess should be provided on the right side if a second electrical lead is used to connect the right side of the upper bus bar to the electrical circuit. A recess also is desirable at the intersection of the upper bus bar with the edge of the SLR film stack. The recesses serve to more evenly distribute electrical power. Suitable fault detection circuitry such as circuitry 63 also can be incorporated in the manner known to the skilled of the art.

Referring now specifically to FIG. 3, sputter coating 25 is seen to be a film stack wherein a dielectric film 31 of zinc oxide is deposited directly on laminated surface 14 of glass ply 12. An electrically conductive film 33 of silver metal covers dielectric film 31. A second dielectric film 35, preferably again zinc oxide, covers electrically conductive film 33. Next, a second electrically conductive film 37, specifically a second film of silver metal, covers dielectric film 35. Dielectric film 39 of tantalum pentoxide covers electrically conductive film 37. The tantalum pentoxide lies immediately adjacent laminated surface 18 of PVB ply 19. An ultra-thin adhesion film 38 of copper or zinc is positioned between the tantalum pentoxide film 39 and the second silver film 37. It should be understood that if tantalum pentoxide is employed in place of zinc oxide in the other dielectric films, then an adhesion film of copper or zinc preferably would be used at each additional interface of tantalum pentoxide with silver.

It will be readily recognized by those skilled in the art that both electrical heating and SLR functionality can be achieved with a Fabry-Perot interference filter as just described without the second dielectric film and second silver film. The present invention is, of course, equally applicable to such an embodiment (and to innumerable other variations). The thin adhesion film and then the tantalum pentoxide dielectric layer would in that case will lie directly over the sole silver metal film and provide the same benefit of interfacial adhesion durability.

Tantalum pentoxide may advantageously be used in lieu of zinc oxide even in dielectric layers not having an interface with a flexible polymeric laminating layer. Such substitution would have the advantage of reducing the number of different materials used in the film stack. This would reduce the complexity of the fabrication process and would be especially advantageous where the film stack is to be deposited by sputtering using commercially available equipment having a capacity for a limited number of sputter targets. Thus, for example, equipment able to hold three target materials could be loaded with a silver metal target for all electrically conductive silver films in the film stack, a tantalum metal target for all dielectric films in the film stack (to be deposited in an oxidizing atmosphere to yield tantalum pentoxide), and a copper or zinc target for an adhesion film at each silver/tantalum pentoxide interface.

The adhesion film of the invention can be deposited as the adhesion promoting layer in a film stack in accordance with equipment and methods known to those skilled in the art. Sufficiently uniform films of desired thickness can be deposited by sputtering in a non-oxidizing atmosphere onto a previously deposited silver film or onto a tantalum pentoxide dielectric film. In a motor vehicle windshield in accordance with the preferred embodiment described herein, a copper or zinc adhesion film typically would have a thickness of about 1 to 4 nm, more preferably about 1.5 to 2.5 nm, most preferably 2 nm. The adhesion films of the invention can be deposited also by chemical vapor deposition techniques, pyrolytic deposition processes, etc. Deposition of the adhesion film differs from the practice of depositing a thin sacrificial film during a sputter coating process to prevent oxidation of the silver metal film. In depositing a zinc oxide dielectric film over a silver metal film, for example, a zinc target is sputtered in an oxidizing atmosphere. A thin sacrificial film of zinc may be deposited, however, by delaying introduction of the oxidizing atmosphere. Sputtering continues as the oxidizing atmosphere is introduced. All or substantially all of the sacrificial film is converted to zinc oxide as part of the dielectric film. A sacrificial film may be used in the present invention by delaying introduction of an oxidizing atmosphere while sputtering a tantalum target. This results in deposition of a thin sacrificial film of tantalum metal over the adhesion film. All or substantially all of the tantalum metal will be oxidized upon introduction of the oxidizing atmosphere, but will serve to substantially protect most or all of the copper or zinc metal of the adhesion film from oxidation. In an alternative approach, the zinc or copper adhesion film can be deposited to an increased thickness. The increased thickness then serves as the sacrificial protection against oxidation of the remaining adhesion film and silver film.

In one highly preferred embodiment the film stack consists of the following films in the order recited: a first dielectric film of sputtered tantalum pentoxide approximately 35 to 50 nm, more preferably 28 to 42 nm thick, most preferably about 38 nm thick; an electrically conductive sputtered film of silver metal approximately 7 to 12 nm, more preferably 7 to 9 nm thick, most preferably about 8 nm thick; a second dielectric film of sputtered zinc oxide approximately 60 to 100 nm thick, most preferably about 80 nm thick; a second electrically conductive film of sputtered silver metal approximately 7 to 9 nm thick, most preferably about 8 nm thick; and a third dielectric film of sputtered tantalum pentoxide about 28 to 42 nm thick, most preferably about 38 nm thick; with an interfacial adhesion film of sputtered copper approximately 1 to 4 nm thick, most preferably about 2 nm thick, between each tantalum pentoxide film and the adjacent silver metal films.

The following example illustrates the efficacy of an embodiment of the invention suitable for use in a motor vehicle windshield application.

EXAMPLE

The durability of the interfacial adhesion of a film stack on a surface of a substrate ply at an interface with a laminating ply in a laminated glazing unit in accordance with a preferred embodiment of the invention was evaluated. The evaluation was conducted by comparing the interfacial adhesion of a film stack comprising a silver film sandwiched between $Ta_2O_5$ films with and without the adhesion films of the invention. Specifically, the durability of such interfacial adhesion against prolonged exposure to UV radiation was tested by means of the pummel test, which test is well known and used in the testing of motor vehicle laminated windshields. In the pummel test a test piece of the laminated glazing unit, typically 150 mm by 150 mm, is soaked at 0° F. for a period of two hours. The test piece is removed and subjected to overall pummeling by hydraulic hammer and then examined to determine pummel adhesion value by comparison to standards distributed by Monsanto Company, St. Louis, Mo., a supplier of PVB. If all of the glass substrate ply delaminates from the PVB laminating layer, a test result of 0 is given to the test sample. If all the glass is retained in bonding contact with the PVB, a test result of 10 is given to the test piece. A pummel test score in the range of about 3 to 7 is normally targeted for a motor vehicle windshield. In the present tests the principle objective is to determine the degree to which adhesion is lost by exposure to UV radiation. Good interfacial adhesion durability is demonstrated if the pummel test score does not change (i.e., decrease) significantly after exposure to UV radiation. Two test pieces, as described, were prepared from each of the following test samples. The test samples were substantially identical to each other except as specifically noted.

Test Sample No. 1—Two glass substrate plys, each 2.3 mm thick, were laminated together by a PVB laminating ply which is 0.76 mm thick. The laminated surface of the first glass ply carried a sputter coated film stack consisting of, in order, a 40 nm thick $Ta_2O_5$ film, a 12 nm thick silver metal film, and a 40 nm thick second $Ta_2O_5$ film. In depositing the second $Ta_2O_5$ film, an ultra-thin sacrificial film of tantalum metal was deposited before the oxidizing atmosphere was introduced into the sputtering chamber. Substantially all such tantalum metal was oxidized by the oxidizing atmosphere, but the silver metal film was thereby protected against oxidation.

Test Sample No. 2—Same as Test Sample No. 1 except that, in accordance with a preferred embodiment of the present invention, the sputtered film stack included ultra-thin adhesion film of copper metal on each side of the silver metal film. Thus, the film stack consisted of, in order, a 40 nm thick film of $Ta_2O_5$ directly on the glass surface, a 2 nm thick adhesion film of copper metal, a 10 nm thick film of silver metal, a 2 nm thick second adhesion film of copper metal, and (immediately adjacent the PVB) a 40 nm thick film of $Ta_2O_5$.

Test Sample No. 3—Same as Test Sample No. 2 except that a sacrificial film of tantalum metal was not deposited in the course of depositing the second $Ta_2O_5$ film. Rather, an extra thickness of copper metal was sputtered after the silver metal film and before the second $Ta_2O_5$ film. Specifically, about 3 nm of copper metal was deposited, approximately 1 nm of which was then sacrificially oxidized during deposition of the $Ta_2O_5$ film.

The test pieces underwent accelerated UV exposure in an Atlas Ci65 xenon arc weatherometer, operated at 0.55 watts/m$^2$, 50° C. and 50% relative humidity. The test pieces then underwent pummel testing as described above. The results of the pummel tests conducted on the test pieces of each of the above test samples are presented in the following table.

| Test Sample | Pummel Test Results | |
| --- | --- | --- |
| | Hours of Accelerated UV Exposure | Pummel Test Score |
| No. 1 | 0 | 0 |
| | 500 | 0 |
| | 1000 | 0 |
| | 1500 | — |
| | 2000 | — |
| No. 2 | 0 | 9 |
| | 500 | 9 |
| | 1000 | 9 |
| | 1500 | 9 |
| | 2000 | 9 |
| No. 3 | 0 | 9 |
| | 500 | 9 |
| | 1000 | 9 |
| | 1500 | 9 |
| | 2000 | 9 |

From the above test results it can be seen that even after 2000 hours of accelerated UV exposure, the pummel score is unchanged for Test Samples No. 2 and 3, the laminated glazing unit test samples embodying the present invention. That is, there is no measured decrease in the interfacial adhesion. This demonstrates the excellent interfacial adhesion durability, particularly resistance to UV exposure, of glazing units of the invention. In contrast, the pummel test score of Test Sample No. 1, having no adhesion layer, is zero. Examination of the Test Sample No. 1 test pieces revealed that interfacial adhesion failed at the $Ta_2O_5$/silver interface on both sides of the silver film and not at the $Ta_2O_5$/PVB interface.

It will be understood by those skilled in the art that the pummel test result for glazing units of the invention can be modified. The moisture level of the PVB laminating layer can be modified, for example, to control the level of adhesion. Also, adhesion modifier can be incorporated into the PVB. Both Monsanto Company and E.I. duPont deNemoirs Company produce multiple adhesion grades of PVB suitable for use in the present invention. Regardless of the initial level of adhesion, the present invention provides significant advantage in protecting interfacial adhesion against degradation.

Although the invention is described herein with reference to preferred features and embodiments, it will be understood by those skilled in the art in view of this disclosure that various alterations, substitutions and modifications may be made without departing from the true scope and spirit of the invention as defined by the following claims.

I claim:

1. A motor vehicle glazing unit comprising a PVB laminating ply sandwiched between two glass plys, a substantially transparent, electrically conductive film stack at an interface between the PVB laminating ply and one of the two glass plys, and means for passing an electrical current through the film stack to heat the windshield, the film stack consisting essentially of a tantalum pentoxide dielectric film about 35 to 50 nm thick adjacent the PVB laminating ply, an adhesion film of copper or zinc about 1 to 4 nm thick over the tantalum pentoxide dielectric film, a silver metal film about 7 to 12 nm thick over the adhesion film; a second adhesion film of copper or zinc about 1 to 4 nm thick over the silver metal film; and a second dielectric film of tantalum pentoxide about 35 to 50 nm thick over the second adhesion film.

2. A laminated glazing unit comprising a glass substrate ply having a surface, a polymeric laminating ply, and a substantially transparent solar load reduction coating on the surface of the substrate ply laminated between the glass substrate ply and the polymeric laminating ply, the coating consisting essentially of, in order, a tantalum pentoxide dielectric film adjacent the polymeric laminating ply, an adhesion film of copper or zinc, a first film of silver metal, a second dielectric film, a second film of silver metal, and a third dielectric film adjacent the substrate ply and means for passing an electrical current through the solar load reduction coating to heat the window.

* * * * *